United States Patent
Zhao et al.

(10) Patent No.: US 10,907,077 B1
(45) Date of Patent: Feb. 2, 2021

(54) METHOD AND DEVICE OF ATTACHING FLEXIBLE SCREEN TO COVER PLATE AND TERMINAL

(71) Applicant: BEIJING XIAOMI MOBILE SOFTWARE CO., LTD., Beijing (CN)

(72) Inventors: Ming Zhao, Beijing (CN); Gaocai Han, Beijing (CN); Heming Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/740,413

(22) Filed: Jan. 11, 2020

(30) Foreign Application Priority Data

Sep. 24, 2019 (CN) .......................... 2019 1 0907613

(51) Int. Cl.
| | |
|---|---|
| *H04M 1/00* | (2006.01) |
| *C09J 7/29* | (2018.01) |
| *H04M 1/02* | (2006.01) |
| *B32B 7/12* | (2006.01) |
| *C09J 7/40* | (2018.01) |
| *B32B 37/00* | (2006.01) |

(52) U.S. Cl.
CPC ........ *C09J 7/29* (2018.01); *B32B 7/12* (2013.01); *B32B 37/0053* (2013.01); *C09J 7/405* (2018.01); *H04M 1/0268* (2013.01); *B32B 2457/208* (2013.01)

(58) Field of Classification Search
CPC .......... H04M 1/00; H04M 1/0268; C09J 7/29; C09J 7/405; B32B 7/12; B32B 37/0053; B32B 2457/208

USPC ...................................................... 455/575.8
See application file for complete search history.

(56) References Cited

U.S. PATENT DOCUMENTS

| | | | |
|---|---|---|---|
| 2014/0138009 A1 | 5/2014 | Lim et al. | |
| 2018/0203483 A1 | 7/2018 | Kwak et al. | |
| 2019/0299582 A1* | 10/2019 | Zheng | B32B 37/1018 |

(Continued)

FOREIGN PATENT DOCUMENTS

| | | |
|---|---|---|
| JP | 5297465 B2 | 9/2013 |
| WO | 2014021687 A1 | 2/2014 |

OTHER PUBLICATIONS

Extended European Search Report in Application No. 20156950, dated Sep. 25, 2020.

(Continued)

*Primary Examiner* — Sonny Trinh
(74) *Attorney, Agent, or Firm* — Syncoda LLC; Feng Ma

(57) ABSTRACT

A method of attaching a flexible screen to a cover plate includes: adhering a first adhesive film layer of a laminated adhesive film to a mounting surface of a cover plate, in which the laminated adhesive film includes the first adhesive film layer, a second adhesive film layer and a second release layer, the second release layer is releasably attached to the second adhesive film layer, the first and second release layer are respectively disposed on both sides of the second adhesive film layer; releasing the second release layer from the second adhesive film layer; and adhering the second adhesive film layer to a flexible screen such that the cover plate is attached to the flexible screen. A tight attachment between the laminated adhesive film and the cover plate can be achieved.

20 Claims, 13 Drawing Sheets

(56) References Cited

U.S. PATENT DOCUMENTS

2019/0315109 A1* 10/2019 Zhang ................ B32B 37/0053
2020/0101712 A1*  4/2020 Qiao .................. H01L 51/0097

OTHER PUBLICATIONS

Mark Co: TBK-708 Cured Screen laminating machine laminating Iphone 6 LCD Screen, Mar. 9, 2017, p. 1, XP054980894.

* cited by examiner ations consistent with the invention and, together with the
METHOD AND DEVICE OF ATTACHING FLEXIBLE SCREEN TO COVER PLATE AND TERMINAL

CROSS-REFERENCE TO RELATED APPLICATION

This application claims priority to Chinese Patent Application No. 201910907613.6 filed on Sep. 24, 2019, the disclosure of which is hereby incorporated by reference in its entirety.

BACKGROUND

With the development of terminal devices such as mobile phones and tablet computers, more and more terminal devices are installed with flexible curved screens since large-curvature screens and surrounded curved screens can be realized on terminal devices due to their characteristics of beautiful appearance, practicability and bendability. Accordingly, the installation process of the flexible screen and the cover plate which is attached to the flexible screen also needs to be updated synchronously.

SUMMARY

The present disclosure relates generally to the field of terminal device production, and more specifically to method and device of attaching flexible screen to cover plate, a terminal and a computer-readable storage medium.

According to a first aspect of embodiments of the present disclosure, there is provided a method of attaching a flexible screen to a cover plate, including: adhering a first adhesive film layer of a laminated adhesive film to a mounting surface of the cover plate, wherein the laminated adhesive film includes the first adhesive film layer, a second adhesive film layer and a second release layer, the second release layer being releasably attached to the second adhesive film layer, and the first adhesive film layer and the second release layer being respectively disposed on both sides of the second adhesive film layer; releasing the second release layer from the second adhesive film layer; and adhering the second adhesive film layer to the flexible screen such that the mounting surface of the cover plate is attached to the flexible screen.

According to a second aspect of embodiments of the present disclosure, there is provided a device for attaching flexible screen to cover plate, including: a first attaching unit configured to adhere a first adhesive film layer of a laminated adhesive film to a mounting surface of a cover plate, in which the laminated adhesive film includes the first adhesive film layer, a second adhesive film layer and a second release layer which are superimposed to each other, the second release layer being releasably attached to the second adhesive film layer, and the first adhesive film layer and the second release layer being respectively disposed on both sides of the second adhesive film layer; a second releasing unit configured to release the second release layer from the second adhesive film layer; and a second attaching unit configured to adhere the second adhesive film layer to the flexible screen such that the mounting surface of the cover plate is attached to the flexible screen.

According to a third aspect of embodiments of the present disclosure, there is provided a terminal, including: the cover plate attached to the flexible screen with the method described above, wherein the laminated adhesive film is configured with localized different adhesive film layers to ensure a tight attachment between the laminated adhesive film and the cover plate during the method of attaching.

According to a fourth aspect of embodiments of the present disclosure, there is provided an electronic device, including: a memory configured to store instructions; and a processor configured to call the instructions stored in the memory to execute the method of attaching flexible screen to cover plate according to the first aspect.

According to a fifth aspect of embodiments of the present disclosure, there is provided a computer-readable storage medium, wherein instructions are stored in the computer-readable storage medium; and when the instructions are executed by a processor, the method of attaching flexible screen to cover plate according to the first aspect is executed.

It should be understood that the above general description and the following detailed description are exemplary and explanatory, and are not intended to limit the present disclosure.

BRIEF DESCRIPTION OF THE DRAWINGS

The accompanying drawings, which are incorporated in and constitute a part of this disclosure, illustrate embodiments consistent with the invention and, together with the disclosure, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Various embodiments of the present disclosure can address that the cover plate and the flexible screen may not be attached tightly, or they are not in an attached state totally or partly. Hence, it is difficult to ensure the quality of the screen.

Figure 1:
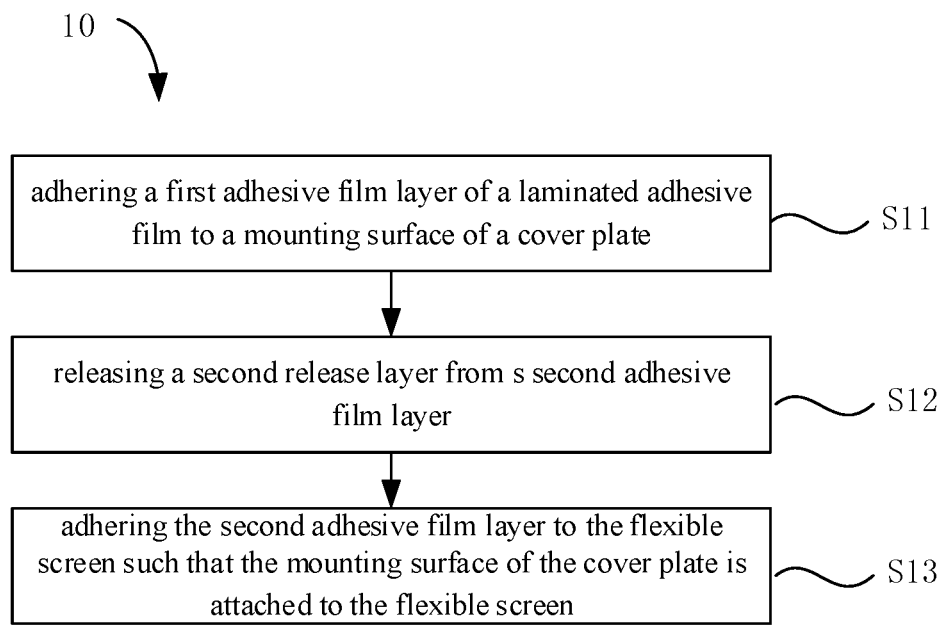
FIG. 1 is a schematic flowchart illustrating a method of attaching flexible screen to cover plate according to an exemplary embodiment.
Figure 2:
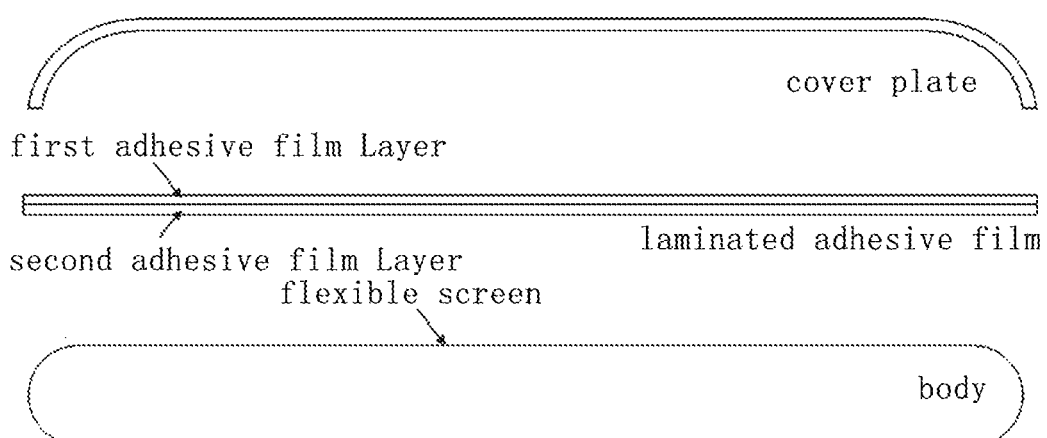
FIG. 2 is a schematic diagram illustrating process of a method of attaching flexible screen to cover plate according to an exemplary embodiment.

Currently, in the process of attaching the cover plate to the flexible screen, after a single-layer adhesive film is attached to the cover plate, the cover plate and the flexible screen may be not attached tightly if the adhesive film has poor adhesion, or the cover plate may not be detached from the flexible screen as required after installation if the adhesive film has strong adhesion. In the present embodiment, there is provided a method 10 of attaching flexible screen to cover plate. Referring to FIGS. 1 and 2, the method 10 of attaching a flexible screen to a cover plate comprises steps S11 to S13, which will be described in detail hereinafter.

Step S11: adhering a first adhesive film layer of a laminated adhesive film to a mounting surface of the cover plate, in which the laminated adhesive film includes the first adhesive film layer, a second adhesive film layer and a second release layer which are superimposed to each other; the second release layer is releasably attached to the second adhesive film layer; and the first adhesive film layer and the second release layer are respectively disposed on both sides of the second adhesive film layer.

In such embodiment, the laminated adhesive film includes the first adhesive film layer and the second adhesive film layer which may be pressed together in advance by adhesive or other means. In some embodiments, the laminated adhesive film may include a substrate, and the first adhesive film layer and the second adhesive film layer may be respectively adhered to both sides of the substrate.

The cover plate may be shaped according to the needs of actual terminals. On a terminal with a bendable curved screen made by the flexible screen, the cover plate has a partial curved surface, and the cross section thereof may be in the shape of a disk as shown in FIG. 2; the cover plate includes a bottom plate and side plates extended in an arc shape from both sides of the bottom plate. A recessed space enclosed by the bottom plate and the side plates is fastened to the terminal. An inner surface of the recessed space is taken as a mounting surface attached to the flexible screen, and a surface, opposite to the recessed space, on the outside of the cover plate is taken as a display surface.

In these embodiments, during assembling of the flexible screen and the cover plate, the flexible screen may be fixed by manufacturing equipment, or may be disposed on a body and further positioned by the body. The body described in the present disclosure may be a body component of the terminal.

The first adhesive film layer is configured to contact with the cover plate, and the second adhesive film layer is configured to contact with the flexible screen, so that the cover plate and the flexible screen can be tightly attached to each other. Moreover, the viscosity of the first adhesive film layer is different from that of the second adhesive film layer. Thus, in the attaching and mounting process, after the laminated adhesive film is adhered to the cover plate, partial detachment will not occur during other processes, particularly the step S12 of releasing the second release layer from the second adhesive film layer. Meanwhile, the viscosity of the second adhesive film layer allows it to be separable in some cases after adhesion. For example, the viscosity is reduced by some solvents or by changing the temperature, so it can be separated when the cover plate of the terminal is required to be disassembled for maintenance in the future.

Step S12: releasing the second release layer from the second adhesive film layer.

After the laminated adhesive film is adhered to the cover plate, the second release layer is to be released from the second adhesive film layer. during which the first adhesive film layer will not be separated from the cover plate as they are firmly attached.

Step S13: adhering the second adhesive film layer to the flexible screen such that the mounting surface of the cover plate is attached to the flexible screen.

The cover plate is attached to the flexible screen by adhering the second adhesive film layer to the flexible screen, and thereby the mounting process is completed.

Figure 3:
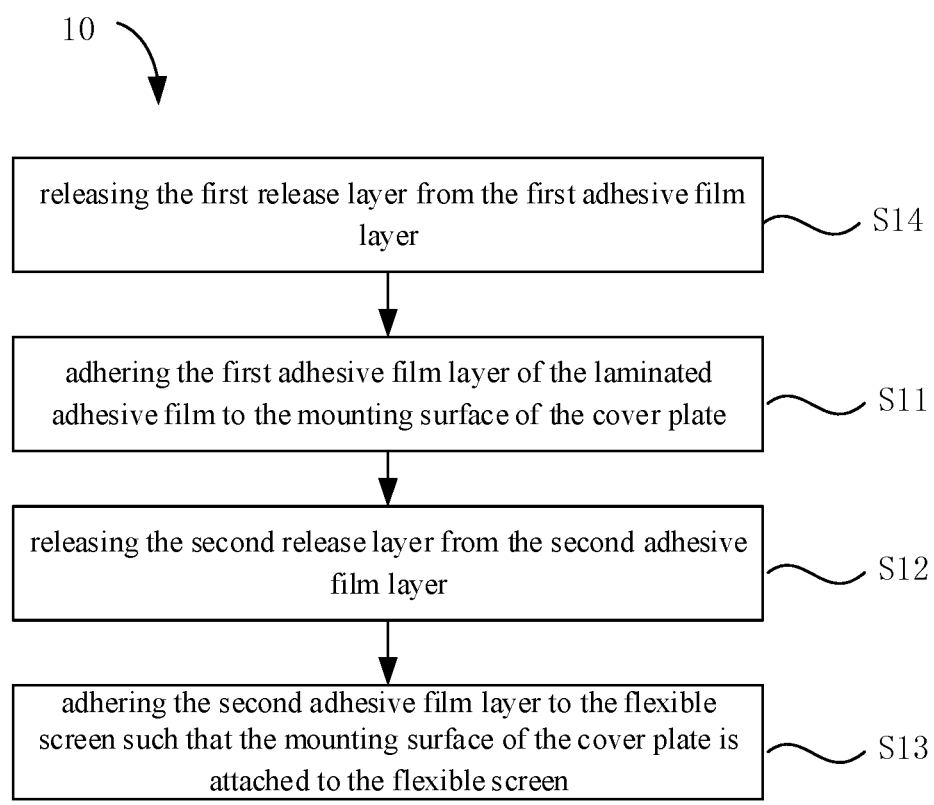
FIG. 3 is a schematic flowchart illustrating another method of attaching flexible screen to cover plate according to an exemplary embodiment.

In some embodiments, referring to FIG. 3, the laminated adhesive film further includes a first release layer which is releasably attached to the first adhesive film layer, and the first release layer and the second adhesive film layer are respectively disposed on both sides of the first adhesive film layer; and the method 10 of attaching flexible screen to cover plate further comprises step S14 of releasing the first release layer from the first adhesive film layer. The first release layer can protect the first adhesive film layer from being polluted before use, and the first release layer is released from the first adhesive film layer before the first adhesive film layer is attached to the cover plate.

In some embodiments, the first adhesive film layer is OCA (optically clear adhesive), and the second adhesive film layer is COF (thermoplastic optical clear adhesive film). Herein, the OCA has high release performance and high viscosity after attaching, ensuring both the convenience of releasing the first release layer and the adhesive strength with the cover plate. The COF is a heat-sensitive adhesive, and after attaching, as being sensitive to alcohol, in some cases such as rework repair, the separation between the cover plate and the flexible screen can be conveniently realized.

As described above, some conventional proposals adopt a single-layer adhesive film, and both sides of the single-layer adhesive film are respectively attached to the flexible screen and the cover plate. However, the laminated adhesive film in the embodiment of the present disclosure has two layers. In order to improve the attaching tightness of the cover plate and the flexible screen, in some embodiments, the total thickness of the first adhesive film layer and the second adhesive film layer is set to be consistent with that of the single-layer adhesive film, particularly, for example, the thickness of each of the first adhesive film layer and the second adhesive film layer may be ½ of the total thickness, so as to avoid poor partial attachment while guaranteeing the tightness between the cover plate and the display screen.

Meanwhile, in order to realize better attachment between the cover plate and the flexible screen, on the basis of the above embodiments of the present disclosure, the attaching process of the cover plate and the flexible screen is further correspondingly improved to enhance the attaching quality, ensure the tight attachment of the cover plate and the flexible screen, and avoid poor partial attachment or not-so-tight attachment.

Figure 4:
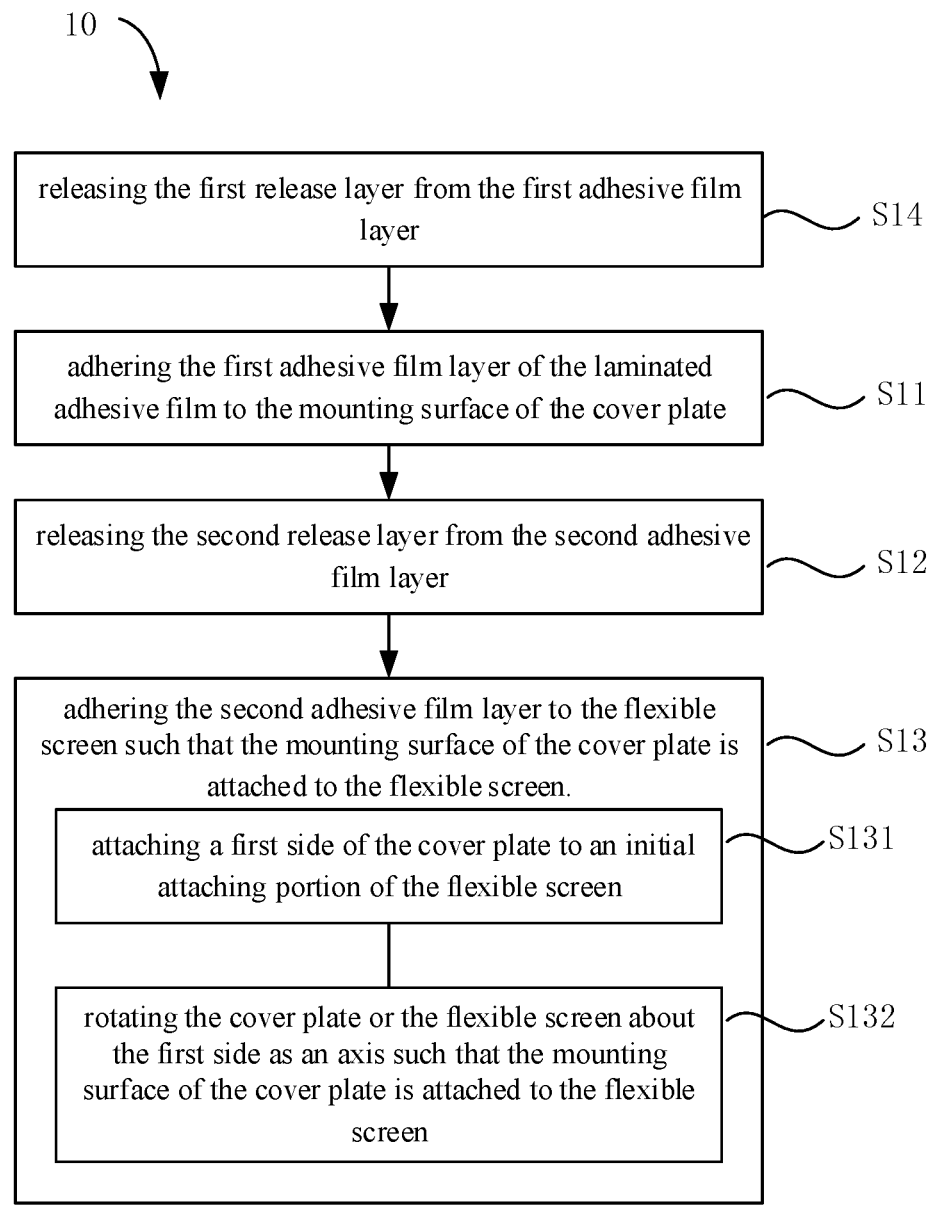
FIG. 4 is a schematic flowchart illustrating another method of attaching flexible screen to cover plate according to an exemplary embodiment.
Figure 5:
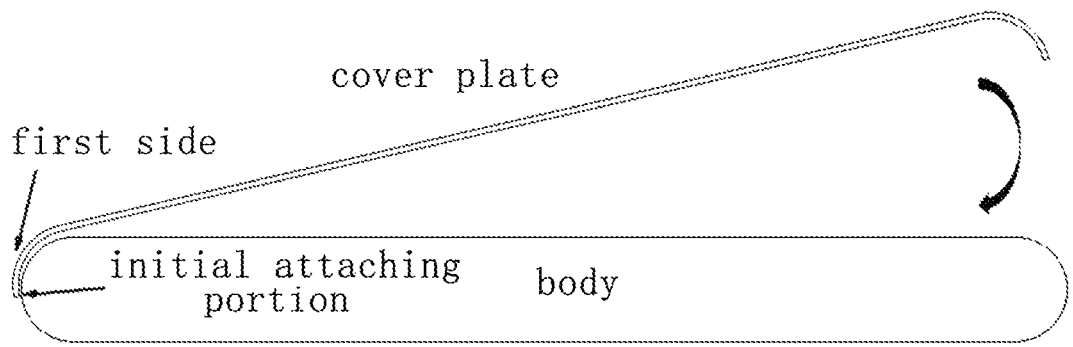
FIG. 5 is a schematic diagram illustrating process of another method of attaching flexible screen to cover plate according to an exemplary embodiment.

In some embodiments, referring to FIGS. 4 and 5, the step S13 of adhering the second adhesive film layer to the flexible screen such that the mounting surface of the cover plate is attached to the flexible screen includes step S131 of attaching a first side of the cover plate to an initial attaching portion of the flexible screen; and step S132 of rotating the cover plate or the flexible screen about the first side as an axis such that the mounting surface of the cover plate is attached to the flexible screen.

In some conventional technologies, the cover plate and the flexible screen make direct contact with each other in a large area, with front surfaces attached, making it difficult for the gas between the cover plate and the flexible screen to be discharged. But in the embodiment of the present disclosure, when the cover plate and the flexible screen are to be attached, the first side of the cover plate (a curved edge on the left side of the cover plate in FIG. 5 is the first side, but it should be noted that the first side is not limited to the left side in FIG. 5 and may be the right side) is attached to the initial attaching portion of the flexible screen at first, and then the cover plate or the flexible screen rotates gradually to allow the cover plate and the flexible screen close to each other and gradually attached to opposite sides, ensuring that the gas may escape smoothly and thereby reducing the formation of air bubbles under the cover plate. In actual attaching process, the body covered with the flexible screen may be fixed and the cover plate is moved for attachment, or the cover plate is fixed and the terminal mounted with the flexible screen is moved, or both the cover plate and the flexible screen are moved by equipment control for attachment.

Figure 6:
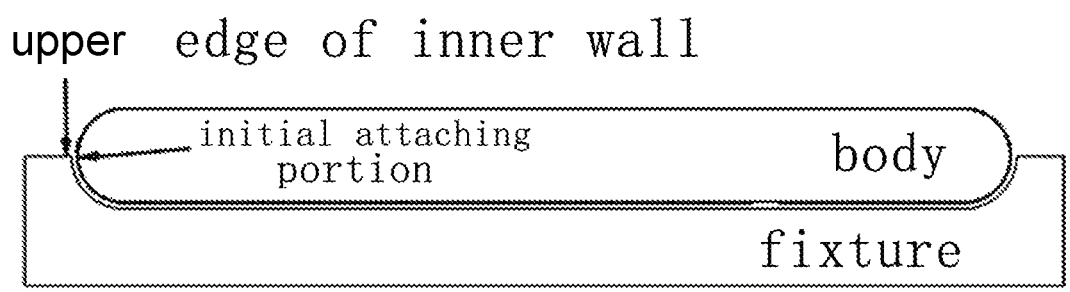
FIG. 6 is a schematic diagram illustrating process of another method of attaching flexible screen to cover plate according to an exemplary embodiment.

In some embodiments, referring to FIG. 6, prior to the step S131 of attaching the first side of the cover plate to the initial attaching portion of the flexible screen, the method further comprises placing the body covered with the flexible screen in a recessed portion of a first fixture such that the flexible screen is protruded out of the recessed portion, and the first side is abutted against an upper edge of an inner wall of the recessed portion when the first side is attached to the initial attaching portion.

In the embodiment, the body is fixed by a first fixture. The first fixture is customized in advance according to the size of the body and the position of the flexible screen covering the body surface such that when the body covered with the flexible screen is placed in the recessed portion of the first fixture, the flexible screen can be protruded out of the recessed portion, and both the starting position and the end position of the flexible screen covering the body correspond to two upper edges of the inner wall of the recessed portion. In the present application, an abutting position of the first side of the cover plate against the upper edge of the inner wall of the recessed position is regarded as the initial attaching portion of the cover plate to the first side of the flexible screen. That is, when the first side of the cover plate is attached to the initial attaching portion of the flexible screen, the first side is abutted against the upper edge of the inner wall of the recessed portion. In this way, the first side of the cover plate is abutted against the upper edge of the inner wall of the recessed portion at first to realize the rapid positioning of the initial attaching portion, and subsequently, the first side of the cover plate is attached to the initial attaching portion to realize accurate and high-efficient positioning and ensure the attaching precision of the cover plate. In the embodiment, the body is fixed in the first fixture and the cover plate is allowed to rotate to be gradually attached to the flexible screen.

In another embodiment, after the step S132 of rotating the cover plate or the flexible screen about the first side as the axis such that the mounting surface of the cover plate is attached to the flexible screen, the method further comprises adopting a roller to press and roll on a display surface of the cover plate opposite to the mounting surface in a direction from the first side to a second side opposite to the first side.

After the first side of the cover plate is attached to the flexible screen, a roller may be adopted to apply pressure from the display surface of the cover plate. Along with the rotation of the cover plate, the roller is driven to move to the second side opposite to the first side. By the pressure of the roller, tighter attachment is realized, and meanwhile, the discharge of gas between the cover plate and the flexible screen is further facilitated.

In another embodiment, the cover plate is rotated towards the flexible screen about the first side as the axis such that the mounting surface is gradually close to the flexible screen until the second side of the cover plate is attached to the flexible screen. in the process of the mounting surface to be gradually close to the flexible screen for completely attaching the mounting surface of the cover plate to the flexible screen, the roller may also be adopted to press and roll on the display surface of the cover plate in a direction from the first side to the second side, and the gas is discharged by the rolling of the roller during attachment to ensure the attaching tightness.

Figure 7:
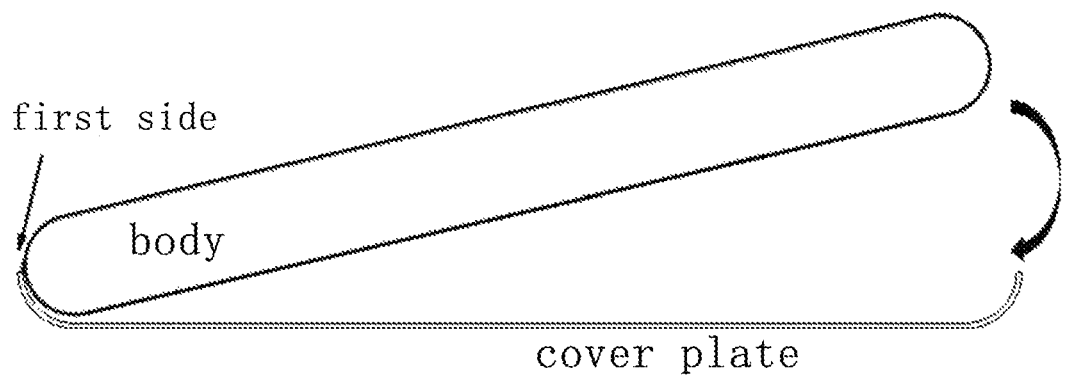
FIG. 7 is a schematic diagram illustrating process of another method of attaching flexible screen to cover plate according to an exemplary embodiment.

In another embodiment, referring to FIG. 7, before the step S131 of attaching the first side of the cover plate to the initial attaching portion of the flexible screen, the method further comprises fixing the cover plate by a second fixture. Moreover, the step of rotating the flexible screen about the first side as the axis such that the mounting surface of the cover plate is completely attached to the flexible screen further includes rotating the flexible screen towards the mounting surface of the cover plate about the first side of the cover plate as the axis, such that the flexible screen is gradually close to the mounting surface until the flexible screen is attached to the second side of the cover plate opposite to the first side.

In the embodiment, the second fixture may be customized in advance according to the size and the structure of the cover plate for fixing the cover plate by means of embedding, suction or clamping. In order to ensure that the mounting surface of the cover plate could be exposed and smoothly attached to the flexible screen, the second fixture may fix the cover plate from the display surface of the cover plate. After the cover plate is fixed, the flexible screen or the body covered with the flexible screen may be moved to allow the initial attaching portion on one side of the flexible screen to be attached to the first side of the cover plate, and subsequently, the flexible screen is rotated continuously to be close to the mounting surface, be gradually and finally completely attached to the cover plate.

Figure 8:
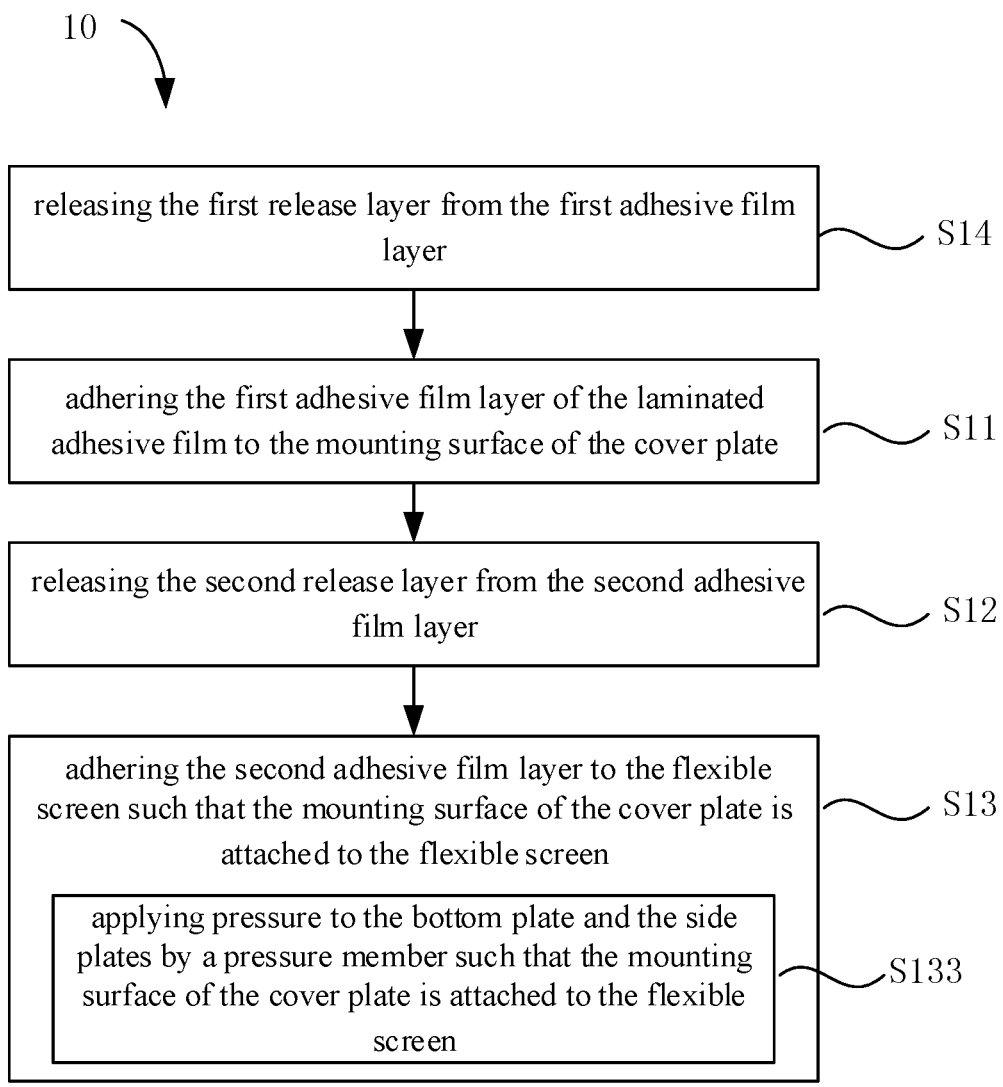
FIG. 8 is a schematic diagram illustrating process of another method of attaching flexible screen to cover plate according to an exemplary embodiment.
Figure 9:
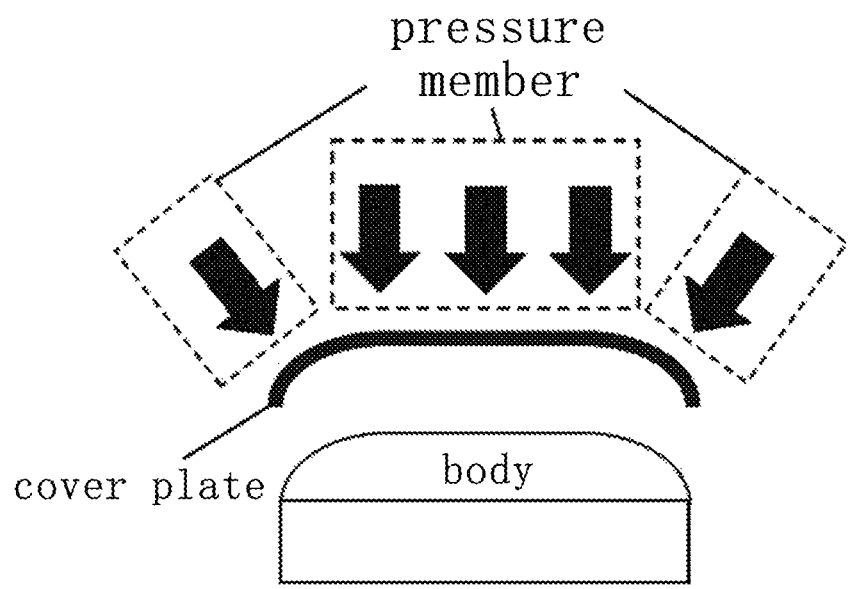
FIG. 9 is a schematic diagram illustrating process of another method of attaching flexible screen to cover plate according to an exemplary embodiment.

In some embodiments, referring to FIGS. 8 and 9, the cover plate in the present disclosure includes a bottom plate and side plates extending in an arc shape from both sides of the bottom plate. Moreover, the step S13 of adhering the second adhesive film layer to the flexible screen such that the mounting surface of the cover plate is attached to the flexible screen includes step S133 of applying pressure to the bottom plate and the side plates by a pressure member, so as to adhere the second adhesive film layer to the flexible screen such that the mounting surface of the cover plate is attached to the flexible screen.

In some conventional arts, as the cover plate includes the bottom plate and the side plates extending in an arc from both sides, pressure is usually applied to the bottom plate by the pressure member in order to ensure the attaching tightness when the cover plate is to be attached to the flexible screen. Due to the shape of the side plates and the contact with the flexible screen, when the pressure member applies pressure, part of side plate is spread out and lifted up, resulting in poor partial attachment. However, in the embodiment of the present disclosure, the pressure member is configured to apply pressure to both the bottom plate and the side plates at the same time so that the close contact between the entire cover plate and the flexible screen is ensured and the attaching quality is improved.

In such embodiments, the pressure member may be one, with the shape fitting with the display surface of the cover plate, and may simultaneously make contact with and apply pressure to both the bottom plate and the side plates. In another embodiment, the pressure member may include a bottom plate pressure member and side plate pressure members. The bottom plate pressure member is configured to contact with and apply pressure to the bottom plate, the side plate pressure member is configured to contact with and apply pressure to the side plate. The bottom plate pressure member and the side plate pressure members cooperate with each other to apply pressure at the same time in the attaching process so that the mounting surface of the cover plate is attached to the flexible screen.

In such embodiments, as the bottom plate has larger area than the side plate, the bottom plate pressure member may be configured to have a relative large contact area to the bottom plate, or configured to contact with the bottom plate with the mode of multi-point contact, to ensure the uniform pressure applied to the bottom plate, so that the bottom plate can be entirely tightly attached to the flexible screen and will not be deformed due to excessive local pressure. Meanwhile, as the side plates are arc-shaped, the shape of a contact surface of the side plate pressure member contacting the side plate may be fitted with an arc-shaped surface of the side plate to ensure the uniform pressure applied to the side plate.

The process of applying pressure may be executed once or multiple times. For applying pressure once, the pressure-applying state may be kept for a period of time after the pressure member is in contact with the cover plate, so that the cover plate can be fully attached to the flexible screen. For applying pressure multiple times, the pressure may be removed after the pressure member has applied pressure to the cover plate, and then the pressure is applied to the cover plate again, and such process may be repeated for multiple times, so as to allow the cover plate to be fully attached to the flexible screen and avoid the problems such as the deformation of the cover plate caused by long-term pressure during pressure application. Meanwhile, the body must be fixed and stable during pressure application to avoid the relative displacement between the cover plate and the flexible screen in the process of pressure application.

In another embodiment, the step of simultaneously applying pressure to the bottom plate and the side plates by the bottom plate pressure member and the side plate pressure members respectively further includes: identifying intersection lines of the side plates and the bottom plate and edges of the side plates by an image photosensitive element; and adjusting pressing positions of the side plate pressure members based on the intersection lines of the side plates and the bottom plate and the edges of the side plates. In such embodiment, the image photosensitive element may be a charge-coupled device (CCD), which can identify the intersection lines of the side plates and the bottom plate and the edges of the side plates by corresponding sensor, controller and the like, to adjust the pressing positions of the side plate pressure members. the positions may include horizontal, longitudinal, and depth positions of the side plate pressure member and the side plate and angles in various directions of the side plate pressure member and the side plate, for ensuring that the side plate pressure members apply vertical pressure to the side plates to protect the side plates and the internal flexible screen, and meanwhile, for realizing the overall contact between the side plates and the flexible screen during pressure application and avoiding partial uplift.

Figure 10:
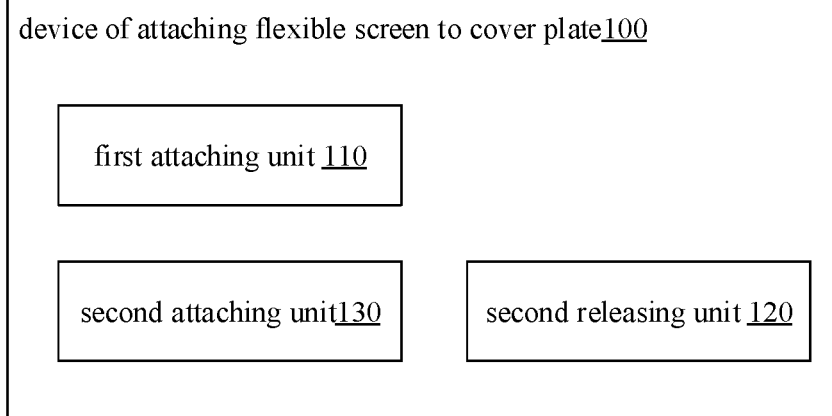
FIG. 10 is a schematic block diagram illustrating a device for attaching flexible screen to cover plate according to an exemplary embodiment.

Based on the same invention concept, FIG. 10 shows a device 100 of attaching flexible screen to cover plate. Referring to FIG. 10, the device 100 of attaching flexible screen to cover plate comprises: a first attaching unit 110 configured to adhere a first adhesive film layer of a laminated adhesive film to a mounting surface of the cover plate, in which the laminated adhesive film includes the first adhesive film layer, a second adhesive film layer and a second release layer which are superimposed to each other; the second release layer is releasably attached to the second adhesive film layer, the first adhesive film layer and the second release layer are respectively disposed on both sides of the second adhesive film layer; a second releasing unit 120 configured to release the second release layer from the second adhesive film layer; and a second attaching unit 130 configured to adhere the second adhesive film layer to the flexible screen such that the mounting surface of the cover plate is attached to the flexible screen.

In some embodiments, the first adhesive film layer is OCA optical clear adhesive film; and the second adhesive film layer is COF thermoplastic optical clear adhesive film.

Figure 11:
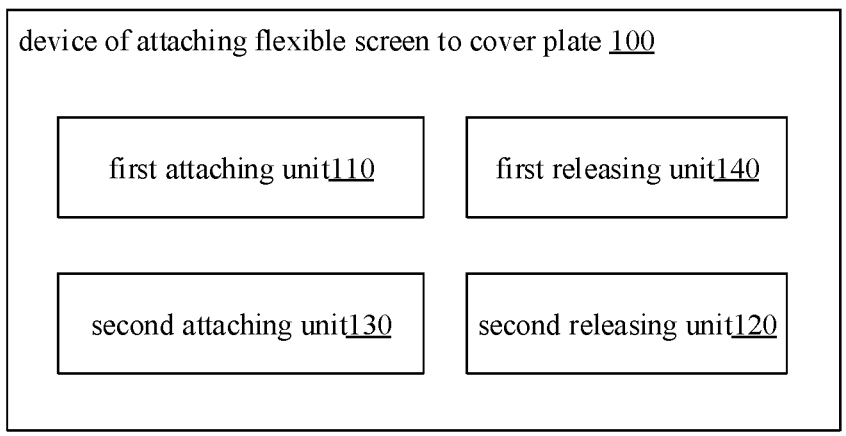
FIG. 11 is a schematic block diagram illustrating another device for attaching flexible screen to cover plate according to an exemplary embodiment.

In some embodiments, referring to FIG. 11, the laminated adhesive film further includes a first release layer releasably attached to the first adhesive film layer, and the first release layer and the second adhesive film layer are respectively disposed on both sides of the first adhesive film layer; and the device 100 of attaching flexible screen to cover plate further comprises a first releasing unit 140 which is configured to release the first release layer from the first adhesive film layer.

In some embodiments, the first adhesive film layer is adhered with the second adhesive film layer; or the laminated adhesive film further includes a substrate, and the first adhesive film layer and the second adhesive film layer are respectively adhered to both sides of the substrate.

Figure 12:
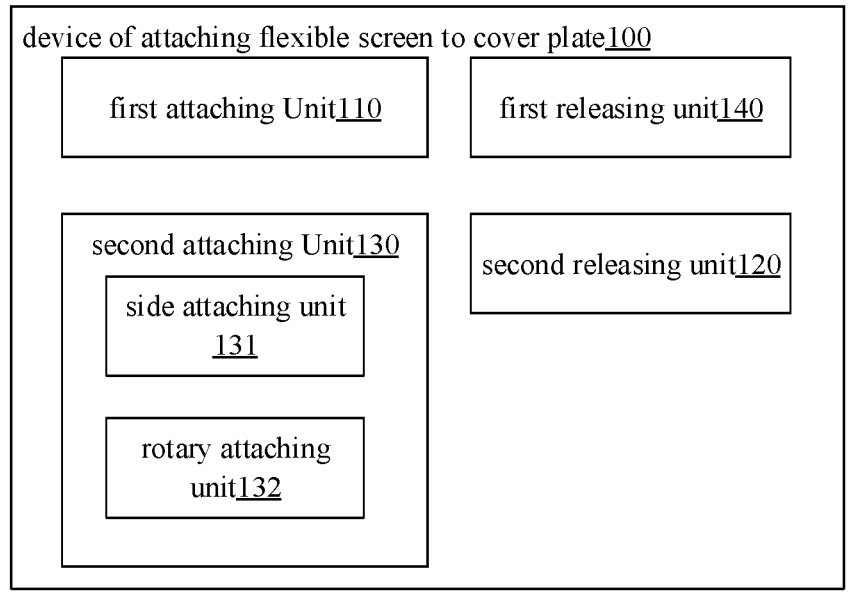
FIG. 12 is a schematic block diagram illustrating another device for attaching flexible screen to cover plate according to an exemplary embodiment.

In some embodiments, referring to FIG. 12, the second attaching unit 130 further includes: a side attaching unit 131 configured to attach the first side of the cover plate to the initial attaching portion of the flexible screen; and a rotary attaching unit 132 configured to rotate the cover plate or the flexible screen about the first side as an axis such that the mounting surface of the cover plate is completely attached to the flexible screen.

Figure 13:
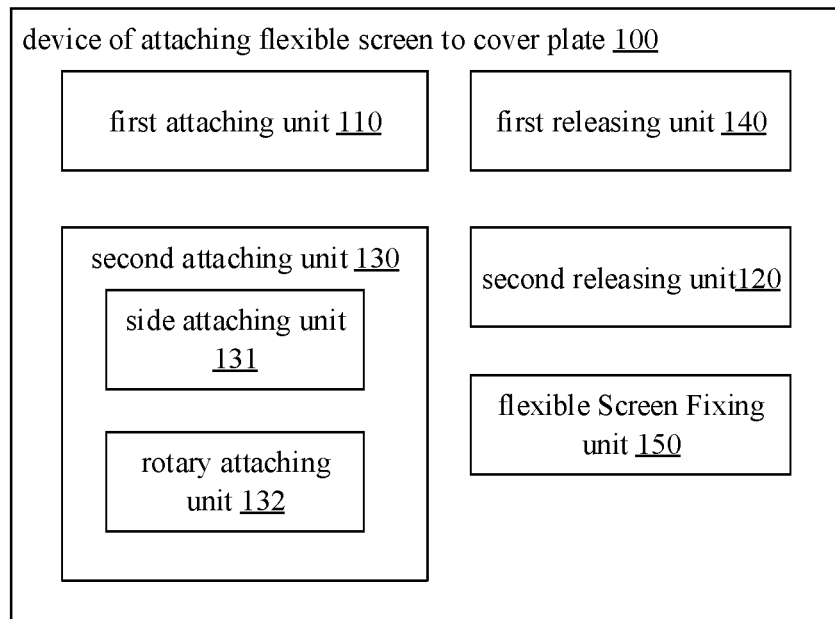
FIG. 13 is a schematic block diagram illustrating another device for attaching flexible screen to cover plate according to an exemplary embodiment.

In some embodiments, referring to FIG. 13, the device 100 of attaching flexible screen to cover plate further comprises: a flexible screen fixing unit 150 configured to place a body covered with the flexible screen in a recessed portion of a first fixture such that the flexible screen is protruded out of the recessed portion, and the edge of the side wall of the recessed portion is corresponding to a position of the first side attached to the flexible screen, and the first side is abutted against an upper edge of the inner wall of the recessed portion when the first side is attached to the initial attaching portion.

Figure 14:
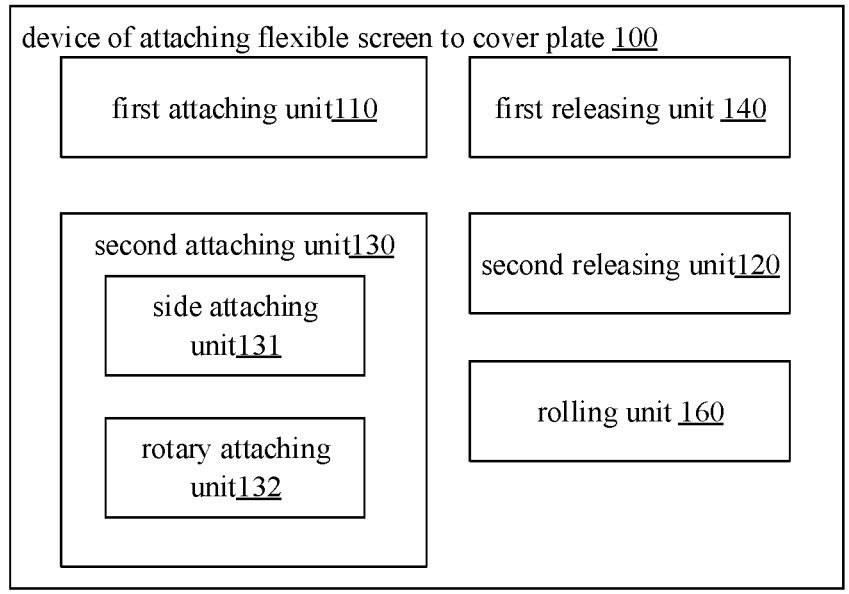
FIG. 14 is a schematic block diagram illustrating another device for attaching flexible screen to cover plate according to an exemplary embodiment.

In some embodiments, referring to FIG. 14, the rotary attaching unit 132 is further configured to rotate the cover plate towards the flexible screen about the first side as the axis such that the mounting surface is gradually close to the flexible screen until the second side of the cover plate is attached to the flexible screen;

the device 100 of attaching flexible screen to cover plate further comprises a rolling unit 160 configured to adopt a roller to press and roll on a display surface of the cover plate opposite to the mounting surface in the direction from the first side to the second side opposite to the first side.

Figure 15:
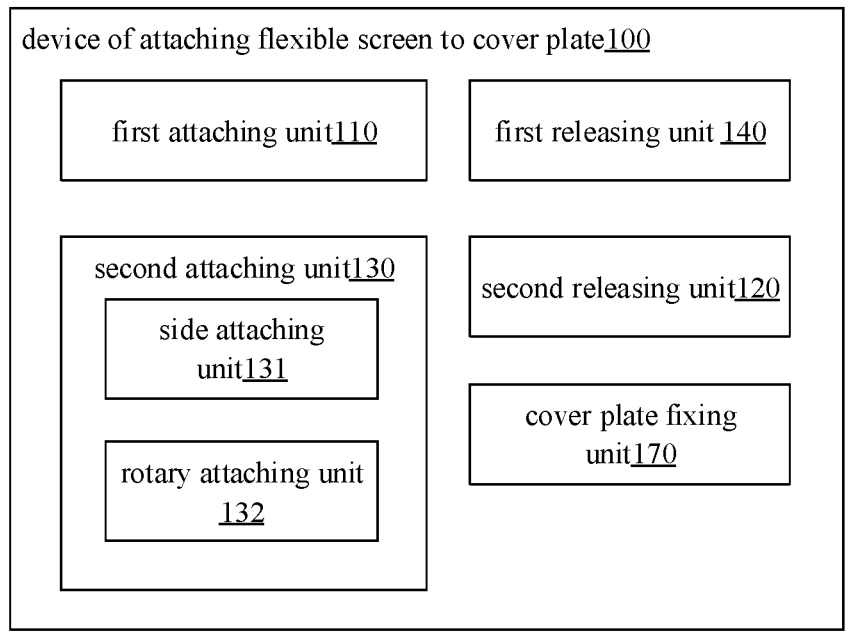
FIG. 15 is a schematic block diagram illustrating another device for attaching flexible screen to cover plate according to an exemplary embodiment.

In some embodiments, referring to FIG. 15, the device 100 of attaching flexible screen to cover plate further comprises a cover plate fixing unit 170 configured to fix the cover plate by a second fixture; and the rotary attaching unit 132 is further configured to rotate the flexible screen towards the mounting surface of the cover plate about the first side as the axis such that the flexible screen is gradually close to the mounting surface until the flexible screen is attached to the second side of the cover plate opposite to the first side.

Figure 16:
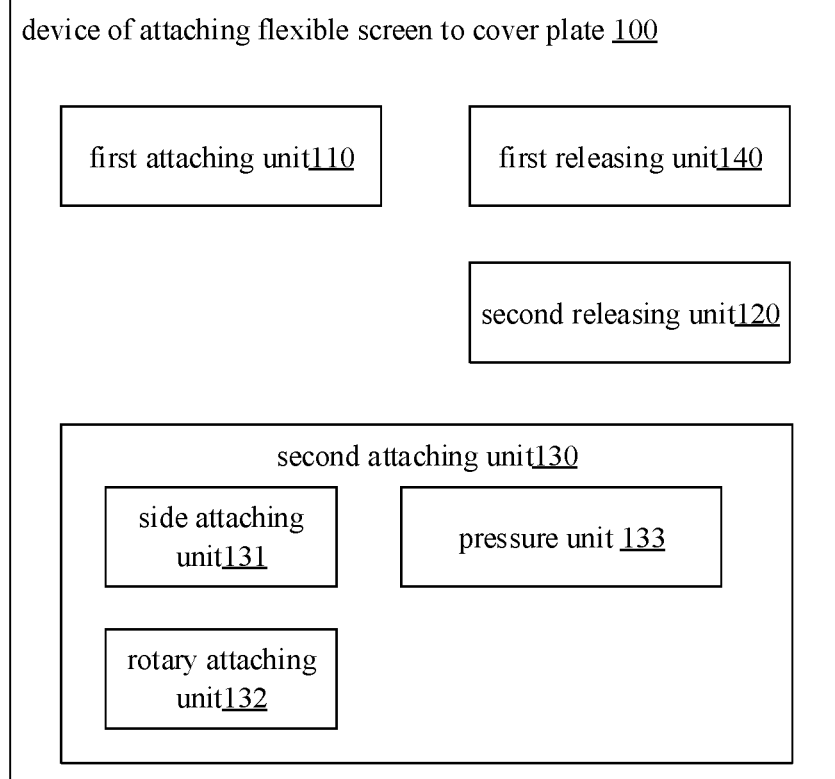
FIG. 16 is a schematic block diagram illustrating another device for attaching flexible screen to cover plate according to an exemplary embodiment.

In some embodiments, referring to FIG. 16, the cover plate includes a bottom plate and side plates extending in an arc shape from both sides of the bottom plate; and the second attaching unit 130 further includes a pressure unit 133 configured to apply pressure to the bottom plate and the side plates by a pressure member such that the second adhesive film layer is adhered to the flexible screen and the mounting surface of the cover plate is attached to the flexible screen.

In some embodiments, the pressure unit 133 is further configured to: simultaneously apply pressure to the bottom plate and the side plates by a bottom plate pressure member and side plate pressure members respectively such that the mounting surface of the cover plate is attached to the flexible screen.

Figure 17:
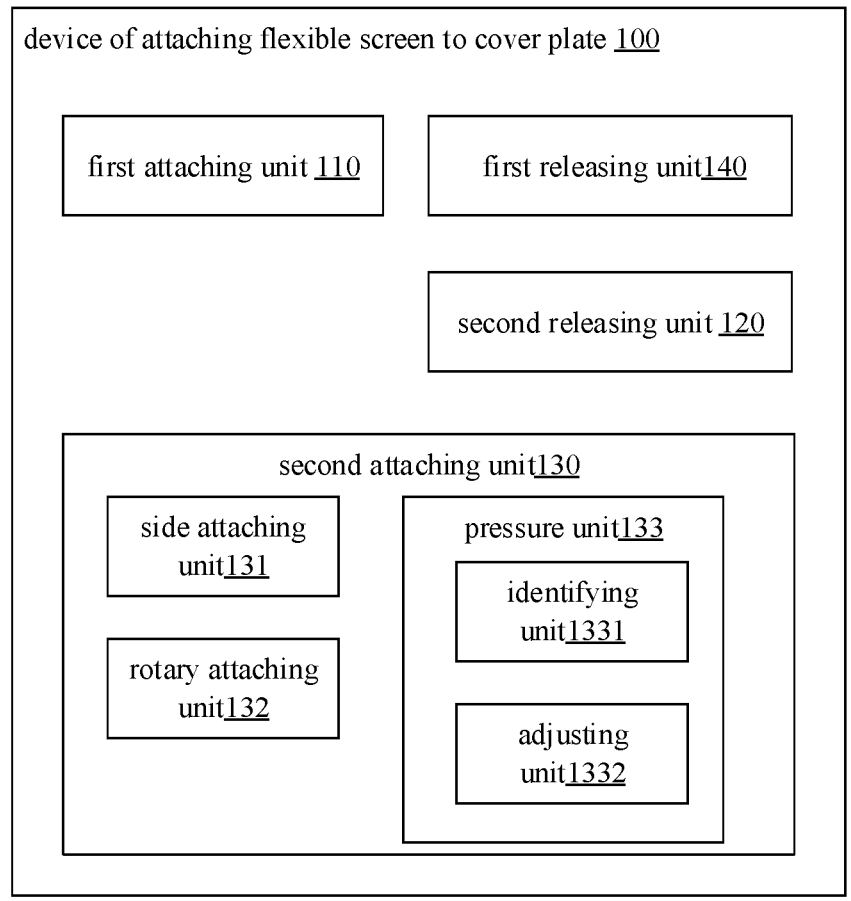
FIG. 17 is a schematic block diagram illustrating another device for attaching flexible screen to cover plate according to an exemplary embodiment.

In some embodiments, referring to FIG. 17, the pressure unit 133 further includes: an identifying unit 1331 configured to identify intersection lines of the side plates and the bottom plate and edges of the side plates by an image photosensitive element; and an adjusting unit 1332 configured to adjust the pressing positions of the side plate pressure members based on the intersection lines of the side plates and the bottom plate and the edges of the side plates.

With respect to the device 100 of attaching flexible screen to cover plate in the above embodiments, the specific manners for performing operations for individual modules therein have been described in detail in the embodiments regarding the methods, which will not be elaborated in detail herein.

Based on the same invention concept, the present disclosure further provides a terminal, which comprises a flexible screen and a cover plate, wherein the cover plate is attached to the flexible screen by implementing the method 100 of attaching flexible screen to cover plate according to any foregoing embodiment.

Various embodiments of the present disclosure can have one or more of the following advantages: the adoption of the laminated adhesive film with partially and localized different adhesive film layers ensures the tight attachment of the laminated adhesive film and the cover plate during the mounting process and can satisfy the attaching requirement of the cover plate and the flexible screen.

With respect to the terminal in the above embodiments, the specific manners for performing operations for individual modules therein have been described in detail in the embodiments regarding the method, which will not be elaborated herein.

Figure 18:
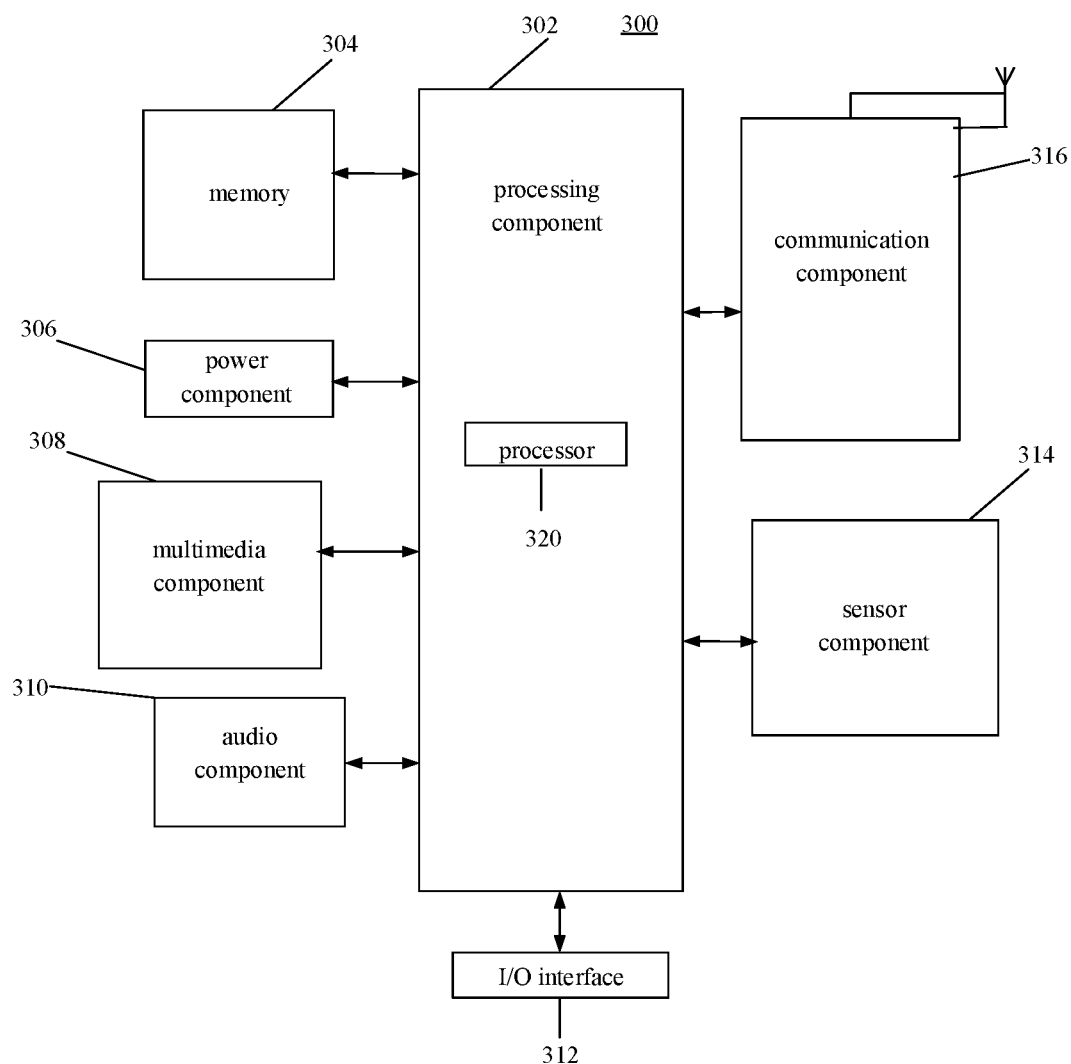
FIG. 18 is a schematic block diagram illustrating a device according to an exemplary embodiment.

FIG. 18 is a schematic block diagram of any foregoing device, according to an exemplary embodiment. For instance, the device 300 may be a mobile phone, a computer, a digital broadcast terminal, a messaging device, a gaming console, a tablet, a medical device, exercise equipment, a personal digital assistant (PDA), and the like.

Referring to FIG. 18, the device 300 may comprise one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the control device 300, such as the operations associated with display, telephone calls, data communications, camera operations, and recording operations. The processing component 302 may include one or more processors 320 to execute instructions to perform all or part of the steps in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operations of the device 300. Examples of such data include instructions for any application or method operated on the device 300, contact data, phonebook data, messages, pictures, videos, etc. The memory 304 may be implemented using any type of volatile or non-volatile storage devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or optical disk.

The power component 306 provides power to various components of the device 300. The power component 306 may include a power management system, one or more power sources, and any other components associated with the generation, management and distribution of power in the device 300.

The multimedia component 308 includes a screen providing an output interface between the device 300 and the user. In some embodiments, the screen may include a liquid crystal display (LCD) and a touch panel (TP). In some embodiments, the screen can include an organic light-emitting diode (OLED) display or other types of displays.

If the screen includes the TP, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 308 includes a front camera and/or a rear camera. The front camera and/or the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For instance, the audio component 310 includes a microphone (MIC) configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a loudspeaker to output the audio signals.

The I/O interface 312 provides an interface between the processing component 302 and peripheral interface modules, such as a keyboard, a click wheel, buttons, and the like. The buttons may include, but not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include an optical sensor, such as a complementary metal oxide semiconductor (CMOS) or charge-coupled device (CCD) image sensor, for usage in imaging applications. In some embodiments, the sensor component 314 may also include an acceleration sensor, a gyroscope sensor, a magnetic sensor, a pressure sensor, or a temperature sensor.

The communication component 316 is configured to facilitate communication, in wired or wireless mode, between the device 300 and other devices. The device 300 can access a wireless network based on a communication standard, such as Wi-Fi, 2G, or 3G, or a combination thereof. In one exemplary embodiment, the communication component 316 receives a broadcast signal or broadcast associated information from an external broadcast management system via a broadcast channel. In one exemplary embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 300 may be implemented with one or more application specific integrated circuits (ASICs), digital signal processors (DSPs), digital signal processing devices (DSPD), programmable logic devices (PLDs), field programmable gate array (FPGAs), controllers, micro-controllers, microprocessors, or other electronic components, for performing the above described methods.

In exemplary embodiments, there is also provided a computer-readable storage medium including instructions, such as a memory 304 including instructions, executable by a processor 320 in the device 300, for performing the above-described methods. For example, the computer-readable storage medium may be an ROM, a random-access memory (RAM), a CD-ROM, a magnetic tape, a floppy disc, an optical data storage device, and the like.

Figure 19:
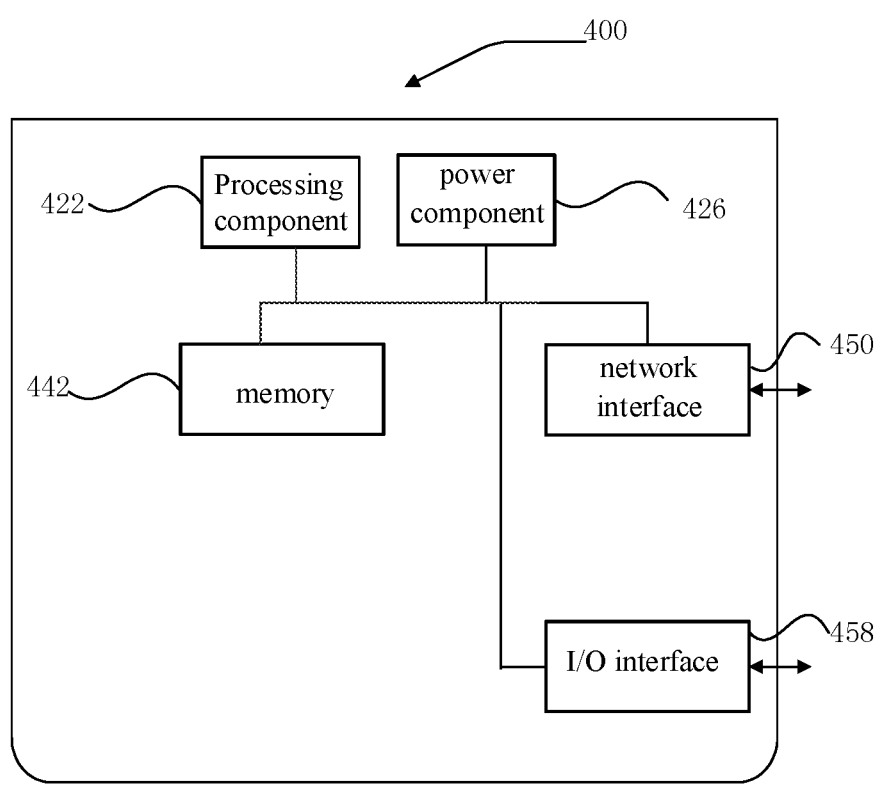
FIG. 19 is a schematic block diagram illustrating an electronic device according to an exemplary embodiment.

FIG. 19 is a block diagram of an electronic device 400, according to an exemplary embodiment. For instance, the device 400 may be a server. Referring to FIG. 19, the device 400 includes a processing component 422 and further includes one or more processors and memory resources represented by a memory 432 which are configured to store instructions executable by the processing component 422, e.g., applications. The applications stored in the memory 432 may include one or more modules corresponding to one group of instructions. In addition, the processing component 422 is configured to execute the instructions to perform the above method.

The device 400 may further include a power component 426 configured to execute the power management of the device 300, a wired or wireless network interface 450 configured to connect the device 400 to the network, and an I/O interface 458. The device 400 may operate an operating system stored in the memory 432, e.g., Windows Server™, Mac OS X™, Unix™, Linux™, FreeBSD™, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "units," "components" or "layers," etc. merely reflect various logical functions according to some embodiments, and actual implementations can have other divisions of "regions," "units," "components" or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, components, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:

1. A method of attaching a flexible screen to a cover plate, comprising:
    adhering a first adhesive film layer of a laminated adhesive film to a mounting surface of the cover plate, wherein the laminated adhesive film comprises the first adhesive film layer, a second adhesive film layer, and a second release layer, the second release layer being releasably attached to the second adhesive film layer, and the first adhesive film layer and the second release layer being respectively disposed on both sides of the second adhesive film layer;
    releasing the second release layer from the second adhesive film layer; and
    adhering the second adhesive film layer to the flexible screen such that the mounting surface of the cover plate is attached to the flexible screen.

2. The method of claim 1, wherein
    the laminated adhesive film further comprises a first release layer which is releasably attached to the first adhesive film layer, and the first release layer and the second adhesive film layer are respectively disposed on both sides of the first adhesive film layer; and
    the method further comprises releasing the first release layer from the first adhesive film layer.

3. The method of claim 2, wherein the first adhesive film layer is adhered to the second adhesive film layer; or the laminated adhesive film further includes a substrate, and the first adhesive film layer and the second adhesive film layer are respectively adhered to both sides of the substrate.

4. The method of claim 1, wherein the adhering the second adhesive film layer to the flexible screen such that the mounting surface of the cover plate is attached to the flexible screen includes:
    attaching a first side of the cover plate to an initial attaching portion of the flexible screen; and
    rotating the cover plate or the flexible screen about the first side as an axis such that the mounting surface of the cover plate is completely attached to the flexible screen.

5. The method of claim 4, prior to the attaching the first side of the cover plate to the initial attaching portion of the flexible screen, further comprising:
    placing a body covered with the flexible screen in a recessed portion of a first fixture such that the flexible screen is protruded out of the recessed portion, and the first side is abutted against an upper edge of an inner wall of the recessed portion when the first side is attached to the initial attaching portion.

6. The method of claim 4, wherein the rotating the cover plate about the first side as the axis such that the mounting surface of the cover plate is completely attached to the flexible screen further includes:
    rotating the cover plate towards the flexible screen about the first side as the axis such that the mounting surface is gradually close to the flexible screen until a second side of the cover plate opposite to the first side is attached to the flexible screen, and concurrently a roller is configured to press and roll on a display surface of the cover plate opposite to the mounting surface in a direction from the first side to the second side.

7. The method of claim 4, after the rotating the cover plate or the flexible screen about the first side as the axis such that the mounting surface of the cover plate is completely attached to the flexible screen, further comprising:
    adopting a roller to press and roll on a display surface of the cover plate opposite to the mounting surface in a direction from the first side to a second side opposite to the first side.

8. The method of claim 4, prior to the attaching the first side of the cover plate to the initial attaching portion of the flexible screen, further comprising:
    fixing the cover plate by a second fixture; and
    the rotating the flexible screen about the first side as the axis such that the mounting surface of the cover plate is completely attached to the flexible screen further includes: rotating the flexible screen towards the mounting surface of the cover plate about the first side of the cover plate as the axis, such that the flexible screen is gradually close to the mounting surface until the flexible screen is attached to a second side of the cover plate opposite to the first side.

9. The method of claim 1, wherein
    the cover plate includes a bottom plate and side plates extending in an arc shape from both sides of the bottom plate; and
    the adhering the second adhesive film layer to the flexible screen such that the mounting surface of the cover plate is attached to the flexible screen includes:
    applying pressure to the bottom plate and the side plates by a pressure member, so as to adhere the second adhesive film layer to the flexible screen such that the mounting surface of the cover plate is attached to the flexible screen.

10. The method of claim 9, wherein the applying pressure to the bottom plate and the side plates by the pressure member such that the mounting surface of the cover plate is attached to the flexible screen includes:
    simultaneously applying pressure to the bottom plate and the side plates by a bottom plate pressure member and side plate pressure members respectively such that the mounting surface of the cover plate is attached to the flexible screen.

11. The method of claim 10, wherein the simultaneously applying pressure to the bottom plate and the side plates by the bottom plate pressure member and the side plate pressure plates respectively further includes:
    identifying intersection lines of the side plates and the bottom plate and edges of the side plates by an image photosensitive element; and adjusting pressing positions of the side plate pressure members based on the intersection lines of the side plates and the bottom plate and the edges of the side plates.

12. A terminal comprising the cover plate attached to the flexible screen with the method according to claim 1, wherein the laminated adhesive film is configured with localized different adhesive film layers to ensure a tight attachment between the laminated adhesive film and the cover plate during the method of attaching.

13. A device for attaching a flexible screen to a cover plate, comprising:
a first attaching unit configured to adhere a first adhesive film layer of a laminated adhesive film to a mounting surface of the cover plate, wherein the laminated adhesive film comprises the first adhesive film layer, a second adhesive film layer and a second release layer, the second release layer being releasably attached to the second adhesive film layer, and the first adhesive film layer and the second release layer being respectively disposed on both sides of the second adhesive film layer;
a second releasing unit configured to release the second release layer from the second adhesive film layer; and
a second attaching unit configured to adhere the second adhesive film layer to the flexible screen such that the mounting surface of the cover plate is attached to the flexible screen.

14. The device of claim 13, wherein the laminated adhesive film further comprises a first release layer releasably attached to the first adhesive film layer, and the first release layer and the second adhesive film layer are respectively disposed on both sides of the first adhesive film layer; and
the device further comprises a first releasing unit which is configured to release the first release layer from the first adhesive film layer.

15. The device of claim 14, wherein the first adhesive film layer is adhered to the second adhesive film layer; or the laminated adhesive film further includes a substrate, and the first adhesive film layer and the second adhesive film layer are respectively adhered to both sides of the substrate.

16. The device of claim 13, wherein the second attaching unit further includes:
a side attaching unit configured to attach a first side of the cover plate to an initial attaching portion of the flexible screen; and
a rotary attaching unit configured to rotate the cover plate or the flexible screen about the first side as an axis such that the mounting surface of the cover plate is completely attached to the flexible screen.

17. The device of claim 16, further comprising: a flexible screen fixing unit configured to place a body covered with the flexible screen in a recessed portion of a first fixture such that the flexible screen is protruded out of the recessed portion and the first side is abutted against an upper edge of an inner wall of the recessed portion when the first side is attached to the initial attaching portion.

18. The device of claim 16, wherein the rotary attaching unit is further configured to rotate the cover plate towards the flexible screen about the first side as the axis such that the mounting surface is gradually close to the flexible screen until a second side of the cover plate is attached to the flexible screen; and
the device further comprises: a rolling unit configured to adopt a roller to press and roll on a display surface of the cover plate opposite to the mounting surface in a direction from the first side to a second side opposite to the first side.

19. The device of claim 16, further comprising:
a cover plate fixing unit configured to fix the cover plate by a second fixture; and
the rotary attaching unit is further configured to rotate the flexible screen towards the mounting surface of the cover plate about the first side of the cover plate as the axis such that the flexible screen is gradually close to the mounting surface until the flexible screen is attached to a second side of the cover plate opposite to the first side.

20. The device of claim 13, wherein
the cover plate includes a bottom plate and side plates extending in an arc shape from both sides of the bottom plate;
the second attaching unit further includes: a pressure unit configured to apply pressure to the bottom plate and the side plates by a pressure member such that the second adhesive film layer is adhered to the flexible screen and the mounting surface of the cover plate is attached to the flexible screen;
the pressure unit is further configured to simultaneously apply pressure to the bottom plate and the side plates by a bottom plate pressure member and side plate pressure members respectively such that the mounting surface of the cover plate is attached to the flexible screen; and
the pressure unit further includes:
an identifying unit configured to identify intersection lines of the side plate and the bottom plates and edges of the side plates by an image photosensitive element; and
an adjusting unit configured to adjust pressing positions of the side plate pressure members based on the intersection lines of the side plates and the bottom plate and the edges of the side plates.

* * * * *